United States Patent Office

2,942,939
Patented June 28, 1960

2,942,939

SEPARATION OF PLUTONIUM VALUES FROM OTHER METAL VALUES IN AQUEOUS SOLUTIONS BY SELECTIVE COMPLEXING AND ADSORPTION

Roy H. Beaton, Richland, Wash., assignor to the United States of America as represented by the United States Atomic Energy Commission No Drawing. Filed Jan. 16, 1947, Ser. No. 722,475

12 Claims. (Cl. 23—14.5)

This invention relates to an adsorption process and more particularly to an adsorption process for separating plutonium from fission products.

It is an object of this invention to provide a simple and efficient means to separate one substance from one or more substances by an adsorption process.

Another object is to provide a method for modifying the adsorption characteristics of substances present in solution.

A more specific object of this invention is to provide an efficient means of separating plutonium from elements contained in solution of neutron irradiated uranium by modifying the adsorption characteristics of at least one of the substances present in solution.

Other objects of this invention will be apparent from the following description.

In accordance with the present invention, it has been found that an effective recovery of a substance may be secured by the formation of a coordination complex compound of that substance with a compound containing at least one atom capable of supplying a pair of unshared electrons to the atomic structure of the substance and thereby forming a coordinate or dative bond therewith. The solution containing the modified form of a compound of the substance is then contacted with an adsorbent to selectively adsorb at least one of the ions of the other substances contained in solution which has not been complexed; thereby affording a means for separating one of the substances from solution from at least one of the modified substances contained therein.

A more specific embodiment of the invention relates to the recovery of plutonium from a solution containing compounds of the elements present in neutron irradiated uranium by forming a coordination complex compound of plutonium with an organic complexing reagent, such as a polycarboxylic acid, including oxalic acid, then contacting the chemically modified solution with an adsorbent wherein the complexed plutonium compound remains in solution and at least one of the other elements present in neutron irradiated uranium may be adsorbed by the adsorbent.

In accordance with another specific embodiment of the present invention it has been found that the effective recovery of plutonium may be secured by forming a coordination complex compound with at least one of the elements, other than plutonium, present in a solution of neutron irradiated uranium; and then by contacting the chemically modified solution containing the non-complexed plutonium compound with an adsorbent to selectively adsorb the plutonium from the solution thereby allowing the complex compounds to be transported by the effluent solution.

Generally speaking, complexes of the type herein contemplated may be secured by using complexing reagents which are capable of forming at least one ionic or polar bond with the molecular form of the substance to be complexed, such as plutonium. These complexing reagents in general contain, in addition to the coordinating atom or radical, an element or radical capable of adding to metals by a polar bond. Typical radicals of such a character include the groups —COOH, —OH, —HSO$_3$, —SCN, —NH$_2$, or —NRH. Compounds of these types will selectively form complexes with either the plutonium contained in solution or with ions of other elements present in a solution of neutron irradiated uranium.

It is well known in the art that the adsorption of a particular cation from a solution by an adsorbent may be facilitated by contacting the solution containing the particular cation with an adsorbent which possesses cation exchange properties, such as organic zeolites and cation exchange resins. Synthetic resinous cation exchangers have been used successfully; and the separation of elements present in solution is accomplished in the present invention by using principles of cation exchange in the following manner. A cation exchanger may be considered to behave as a porous salt containing an insoluble anion and exchangeable cations. When a cation exchanger is immersed in a solution of cations, a competition for the available positions in the cation exchanger takes place with the replaceable cations in the exchanger and those in the surrounding solution.

Generally, these synthetic resin cation exchangers are condensation products of polyhydric phenols and formaldehyde with sulfonic acid group incorporated to increase the adsorption capacity in the low pH region. It has been found that the adsorption of cations by a synthetic resin obeys the law of mass action wherein the ionic part of the adsorbent, such as sodium ion or hydrogen ion, is assumed to behave as if it were monovalent.

It is known that cation exchange resins exhibit specific adsorption affinities toward specific higher-charged cations present in a solution containing elements present in neutron irradiated uranium. In order to enhance the preferential adsorption of the adsorbent toward specific cations, it has been found desirable, in accordance with the present invention, to modify the adsorption characteristics of specific cations present in solution by selectively complexing certain compounds with a complexing reagent, thereby modifying the aggregate molecular charge on the specific substance.

When uranium is subjected to neutron bombardment there is formed in small quantities a new element having the atomic weight of 239 and atomic number of 93, known as neptunium. This new element by virtue of radioactive decay is transformed through a half-life of 2.3 days to a further new element known as plutonium having atomic number of 94. In addition, certain other elements are formed as the result of fission of the U$^{235}$ nucleus, such new elements being referred to as fission fragments, including radioactive decay products, or fission products. The fission fragments are radioactive isotopes which may be included in two general element groups: a "light" fission fragment comprising elements having atomic numbers from about 29–48 such as Br, Kr, Rb, Sr, Y, Zr, Nb, Mo, 43, Ru, Rh, and a "heavy" fission fragment group comprising elements having atomic numbers from 49–64 such as Sb, Te, I, Xe, Cs, Ba, Ce, La, Pr, and Nd. The fission products which we are particularly concerned with are those having a half-life of more than three days since they remain in the neutron irradiated reaction mass in substantial quantities at least one or two months after the reaction period.

The product obtained by neutron bombardment of uranium after more or less aging during or after bombardment comprises a major portion of uranium together with the minor portions rarely in excess of one or two percent by weight of fission products and the element 94 together with more or less of the element 93. The recovery of the element 94 in a concentrated form involves a separation of 94 from such products without excessive loss of the element 94. Preliminary to the adsorption step, the product obtained by neutron bombardment of uranium, containing plutonium, fission products and uranium is dissolved in an acid solution thereby forming compounds of the elements present therein.

It is known that the resinous cation exchangers have a high adsorption capacity and a rapid rate of adsorption for nearly all of the cations present in a solution of neutron bombarded uranium. Since a more selective removal of the cations from the particular solution of neutron bombarded uranium is necessary, a substantial decontamination of the plutonium from fission activity may be accomplished by preferential complexing of the cations present in solution in such a manner that specific cations may or may not be adsorbed by the cation resin exchanger. This process has been further extended as a means of obtaining a partially decontaminated solution that could be decontaminated by a tie-in with further precipitation process, such as the bismuth phosphate process, or by subsequent adsorption or desorption steps in the process.

The separation process is particularly effective when applied by reacting a complexing agent with the plutonium in solution wherein the plutonium is considered in the reduced valence state. The reduced valence state of plutonium which forms complexes with complexing agents includes the plutonium in a valence state not greater than +4, and primarily in the valence state of +3 and +4.

The complexing of a nitric acid solution of neutron bombarded uranium may be accomplished by reacting the solution with an oxalate radical so as to form intercomplex salts. This may be accomplished by the addition of the oxalate radical in the form of potassium oxalate so as to form an intercomplex between the dissociation products of potassium oxalate and the ions of fission products in solution. The influent solution is then allowed to contact a cation resinous exchanger which has been converted to the hydrogen cycle by soaking the exchanger in a weak sulfuric acid solution before use. The complexed neutron irradiated uranyl nitrate solution of about 10 percent concentration is then allowed to flow through the exchanger column.

The rate of adsorption of the plutonium is rapid, and approximately 97 percent of the plutonium is adsorbed by the cation exchange resin. The adsorption of the fission products by the adsorbent approximates 63 percent of the beta-emitting fission products and 19 percent of the gamma-emitting fission products present in the original solution. These data indicate that the oxalate radical does not form intercomplexes with substantially any of the plutonium present in solution and that beta and gamma-emitting fission products were substantially complexed by the addition of the oxalate radical to the neutron irradiated uranyl nitrate solution having an original pH of about 2.4 and a resulting pH of about 4.

It shall be noted that when potassium oxalate is added to a solution of neturon irradiated uranium of about 10 percent concentration having on original pH of about 2.4, approximately 97 percent of the plutonium is adsorbed by the cation exchange resin. When oxalic acid is added to the original solution of 10 percent irradiated uranyl nitrate having an original pH of 2.4, the pH of the solution is reduced to a pH of about 1.5; and the formation of a complexed plutonium compound is substantially increased. As a result about 55 percent of the plutonium is adsorbed by the resinous cation exchanger thereby indicating that in the low pH region of about 1.0 to 3.0, an intercomplex salt of plutonium with the oxalate radical is formed, thereby accounting for the decrease in the plutonium adsorption by the exchanger. Therefore, it is preferred, in the particular instance, to keep the pH of the modified solution containing plutonium at a pH between 2.5–4.0 in order to secure a substantial adsorption of plutonium by the cation resin adsorbent. When it is desired to increase the adsorption separation of elements present in neutron irradiated uranium, such as fission products, and decrease the plutonium adsorption by oxalate complexing the plutonium contained in solution, the pH of the solution shall be held at about 1.5.

Niobium and zirconium are fission products which form a substantial portion of the fission products and are selectively complexed with the oxalate radical; they therefore account for the substantial reduction in the amount of the gamma activity adsorbed by the adsorbent, and thereby remain as complexed compounds in the effluent solution.

It shall be noted that the presence of uranyl ions is considered undesirable, because a substantial amount of the oxalate radical is required to precipitate the uranyl ions contained in solution prior to complexing the ions of plutonium or the fission products.

The use of a phenolic acid, such as tannic acid, as a complexing agent to complex solution containing ions of the elements present in neutron bombarded uranium provides another method for preferentially adsorbing the plutonium by a resinous adsorbent. Complexed compounds may be formed between tannic acid and the beta and gamma emitting fission products in a particular embodiment of the invention when a 5 percent tannic acid solution is contacted with a 10 percent solution of neutron irradiated uranyl nitrate hexahydrate at a pH of about 2.4. The solution is then contacted with a resinous cation exchanger wherein approximately 95 percent of the plutonium is adsorbed by the exchanger including 59 percent and 10 percent of the beta and gamma active fission products, respectively. It shall be noted that the preferential adsorption of the plutonium ions by the exchanger permits a substantial separation of the plutonium from the gamma active fission products, primarily niobium and zirconium, by forming a complexed compound between zirconium and the dissociation products of tannic acid and a complexed compound between niobium and the dissociation products of tannic acid. The complexed fission product compounds remain in the effluent solution, and this thereby affords a method of separating plutonium from fission products.

The use of polycarboxylic acids is preferred as complexing agents to complex specific cations contained in solution; and it is preferred that these carboxylic acids contain an additional hydroxy group attached to the chain. Typical examples of carboxylic acids to be used as complexing agents are citric acid and tartaric acid.

In accordance with a preferred embodiment, a dicarboxylic acid, such as citric acid, having a concentration of about 2.5 percent is added to a 10 percent solution containing the elements present in neutron bombarded uranium having a pH of about 2.4. A substantial portion of the fission products, including zirconium and niobium will be complexed by the dissociation products of citric acid.

The gamma activity adsorption by the adsorbent is decreased to about 8 to 10 percent of the initial activity when using citric acid as a complexing reagent without noticeably affecting the plutonium adsorption which is about 96 percent overall. This result indicates that a substantial portion of the gamma activity is complexed by the dissociation products of citric acid, and these complexed compounds are carried by the effluent solution in the adsorption process. In a 10 percent solution of neutron irradiated uranium, there is a substantial decrease in the adsorption of plutonium by the cation resin exchanger when 10 percent citric acid is added to said solution at a pH of about 2.4 and the solution then contacted with a cation exchanger resin, such as Catex-284, which selectively adsorbs the plutonium from solution. Catex-284 is manufactured by the Infilco Corporation and is specified as a phenol formaldehyde condensation product. It is therefore noted that the preferable concentration of citric acid should be under 8 percent. Citric acid is considered a preferred complexing agent when the complexing of the fission products is desired in a solution having a pH range from approximately 1.0 to 4.0. In addition, it has been found that citric acid in the desired concentrations does not interfere with the subsequent lanthanum fluoride method of separation for plutonium from elements remaining in an eluted solution.

A specific example of the complexing action between citric acid dissociation products and ions of fission products contained in solution may be considered in the following manner. A 10 percent solution of neutron irradiated uranium having a pH of about 2.4 is reacted and complexed with 2.5 percent citric acid. The modified solution is then allowed to contact an adsorbent column containing 50 gm. of 60–100 mesh cation resin exchanger, identified by the trade name Catex-284, contained in an adsorbent bed 19 mm. in diameter and 17 cm. high. The rate of flow of the complexed solution of through-put was approximately 60 g./sq. ft./hr. It shall be noted that the plutonium break-through point came at about 1300 cc. of through-put of a total solution of 4,000 cc. contained in a 10 percent solution of neutron irradiated uranium. The gamma adsorption by the adsorbent of the complexed fission products is extremely low under the influence of citric acid. In the present instance, the gamma activity on the adsorbent was about 9 percent; the beta activity present on the adsorbent was about 63 percent; and approximately 95 percent of the plutonium was adsorbed. These results indicate that a substantial portion of the gamma activity present in a 10 percent solution of neutron irradiated uranium is complexed by the citric acid complexing reaction at a pH of about 2.4; and that a portion of the beta activity is similarly complexed.

In order to separate the plutonium from the other cations which have been adsorbed by the cation resin exchanger, preferential eluting of the plutonium may be attained by first eluting the column with 0.25 M. sulfuric acid to remove the uranium; and then eluting the column with about 400 cc. 0.5 M. sulfuric acid and 1 M. of sodium sulfate to preferentially elute the adsorbed plutonium on the exchanger.

It shall be noted that this process provides a method for separating a substantial portion of the plutonium from the fission products and the uranium by complexing, primarily, the fission products with a complexing reagent, such as tannic acid or citric acid at a pH of about 2.4; and then adsorbing the plutonium by the adsorbent, leaving the complexed fission product elements present in neutron irradiated uranium in solution. The adsorbed substances and the adsorbent are then separated from the solution containing the complexed compounds, and then the plutonium is preferentially desorbed from the adsorbent with a selective elutriant, such as sulfuric acid and sodium sulfate.

It shall be noted that other complexing anions, such as thiocyanate, phosphate and sulfate anions, have exhibited similar complexing properties so as to modify the adsorption characteristics of the fission products contained in a solution of neutron irradiated uranium. In addition, it is preferred that the solution containing the cations to be preferentially separated by an adsorption process be substantially free of uranyl ions, since a large quantity of the complexing anion is required to overcome the presence of said uranyl ion prior to complexing the smaller proportions of ions of fission products or plutonium contained in solution.

While this invention has been illustrated for the adsorption separation of plutonium from uranium and fission products it can be applied to the separation of one metal cation from at least another metal cation where it is possible to form a complex of either one of the metal cations with respect to another metal cation. Thus, a similar process may be used for separating uranium from fission products by complexing uranium in solution wherefrom the fission products will be preferentially adsorbed by the adsorbent leaving the complexed uranium compound in solution. Also this process may be applied to the separation of thorium from rare earths by complexing either the thorium cations or the rare earth cations with a selective complexing reagent, and then separating the non-complexed cations by adsorbing said cations on an adsorbent thereby leaving the complexed cations in effluent solution. It is apparent that by using one complexing agent to complex one or more fission products and uranium present in solution and then by adding another complexing agent to the solution to complex at least one of the other ions remaining in solution, the use of at least two specific complexing agents to complex at least more than one of the ions present in solution affords a more efficient method for modifying the adsorption characteristics of the various cations present in the solution.

Although the present invention has been described with particular reference to the specific details of certain embodiments thereof, it is not intended that such details shall be regarded as limitations upon the scope of the invention except insofar as included in the accompanying claims.

What is claimed is:

1. The process of obtaining plutonium in a more concentrated state from neutron irradiated uranium containing a compound of plutonium in which the plutonium is in a valence state not greater than +4 and compounds of uranium and fission products which comprises forming a solution containing ions of the elements present in neutron irradiated uranium including ions of plutonium in a valence state not greater than +4, adding to said solution alkali oxalate thereby forming complexed compounds with the ions of fission products and the oxalic acid dissociation products, said resulting solution having a pH of at least 2.4, contacting said solution with a cation resin adsorbent to selectively adsorb said plutonium ions from solution leaving the complexed fission product oxalate compounds in solution, and then removing the adsorbed plutonium and the cation resin adsorbent from the solution.

2. A process of separating plutonium values present in a maximum valence state of +4 from fission product values contained together in an aqueous solution, comprising adding a polycarboxylic-anion-containing complexing agent to said aqueous solution, said anion being selected from the group consisting of oxalate, tannate, citrate and tartrate anions so that the pH value of the resulting solution is at least 2.4, whereby the fission product values are complexed while the plutonium values remain substantially uncomplexed; contacting said solution with a cation exchange resin, whereby said noncomplexed plutonium values are adsorbed on said resin while said complexed fission product values remain in said solution; and separating said resin from said solution.

3. The process of claim 2 wherein the pH value ranges between 2.5 and 4.

4. The process of claim 2 wherein the cation exchange resin is a phenol-formaldehyde sulfonic-acid-type resin.

5. The process of claim 2 wherein the complexing agent is an alkali metal oxalate.

6. The process of claim 5 wherein the complexing agent is potassium oxalate.

7. The process of claim 2 wherein the complexing agent is oxalic acid.

8. The process of claim 2 wherein the complexing agent is tannic acid.

9. The process of claim 8 wherein wherein tannic acid is added as a 5% aqueous solution and the plutonium- and fission-products-containing solution has a pH value of about 2.4.

10. The process of claim 2 wherein the complexing agent is citric acid.

11. The process of claim 10 wherein the citric acid is added in the form of an aqueous solution having a maximum concentration of 8%.

12. The process of claim 11 wherein the concentration of the citric acid is about 2.5% and the fission-products- and plutonium-containing solution has a pH value of about 2.4.

References Cited in the file of this patent

CN-728, U.S. Atomic Energy Commission report for month ending June 21, 1943, pages 60-62.

CN-1071, U.S. Atomic Energy Commission document reporting work for the period ending Nov. 11, 1943, declassified Feb. 14, 1957, pages 17, 18.

CN-1859, U.S. Atomic Energy Commission document dated April 19, 1945, declassified Jan. 18, 1956, pages 43, 57, 67 and Fig. 16 (facing page 56).